(12) United States Patent
Jeong et al.

(10) Patent No.: US 10,701,248 B2
(45) Date of Patent: Jun. 30, 2020

(54) IRIS MODULE AND CAMERA MODULE INCLUDING THE SAME

(71) Applicant: Samsung Electro-Mechanics Co., Ltd., Suwon-si (KR)

(72) Inventors: Bong Won Jeong, Suwon-si (KR); Kyung Hun Lee, Suwon-si (KR); Bo Sung Seo, Suwon-si (KR); Young Bok Yoon, Suwon-si (KR); Jung Seok Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/199,492

(22) Filed: Nov. 26, 2018

(65) Prior Publication Data

US 2020/0007721 A1    Jan. 2, 2020

(30) Foreign Application Priority Data

Jun. 28, 2018 (KR) .......................... 10-2018-0074710

(51) Int. Cl.
*H04N 5/232* (2006.01)
*H04N 5/225* (2006.01)
*G02B 7/10* (2006.01)

(52) U.S. Cl.
CPC .......... *H04N 5/2252* (2013.01); *G02B 7/102* (2013.01); *H04N 5/2254* (2013.01)

(58) Field of Classification Search
CPC .................................................. H04N 5/2252
See application file for complete search history.

(56) References Cited

U.S. PATENT DOCUMENTS

| 7,156,564 B2 * | 1/2007 | Watanabe ............... G03B 9/08 396/463 |
| 10,237,458 B2 * | 3/2019 | Lim ........................ G02B 7/09 |
| 2006/0244859 A1 * | 11/2006 | Ji ......................... H04N 5/2253 348/335 |

(Continued)

FOREIGN PATENT DOCUMENTS

| KR | 10-2012-0133910 A | 12/2012 |
| KR | 10-1700771 B1 | 1/2017 |

(Continued)

OTHER PUBLICATIONS

Korean Patent Application No. 10-2018-0053688 filed on May 10, 2018, incorporated by reference in speculation (unpublished) (one of two Korean priority applications of US 2019/0346749 A1, and domestic (Korean) priority application of KR 10-2019-0129656 A) (no English translation) (counterpart of US 2019/0346749 A1).

*Primary Examiner* — Gary C Vieaux
(74) *Attorney, Agent, or Firm* — NSIP Law

(57) ABSTRACT

A camera module includes a housing, a lens module including a yoke and disposed in the housing, an iris module including a plurality of blades and configured to form N apertures having different sizes using the plurality of blades, N being an integer greater than or equal to 2, the iris module being disposed in the housing above the lens module, and an iris driver including a driving coil, and a magnet unit configured to be movable reciprocally in a linear direction and including a driving magnet opposing the driving coil and the yoke, wherein the yoke is configured to enable the magnet unit to be fixed at N positions along a movement path of the magnet unit.

22 Claims, 11 Drawing Sheets

(56) References Cited

U.S. PATENT DOCUMENTS

2017/0324892 A1 11/2017 Kim et al.
2018/0039158 A1 2/2018 Shikama et al.
2019/0058817 A1* 2/2019 Seo ..................... H04N 5/2254
2019/0346749 A1 11/2019 Seo

FOREIGN PATENT DOCUMENTS

KR  10-2017-0123615 A  11/2017
KR  10-2019-0129656 A  11/2019

* cited by examiner

IRIS MODULE AND CAMERA MODULE INCLUDING THE SAME

CROSS-REFERENCE TO RELATED APPLICATIONS

This application claims the benefit under 35 USC 119(a) of Korean Patent Application No. 10-2018-0074710 filed on Jun. 28, 2018, in the Korean Intellectual Property Office, the entire disclosure of which is incorporated herein by reference for all purposes.

BACKGROUND

1. Field

This application relates to an iris module and a camera module including the same.

2. Description of Related Art

For some time now, a camera module has been a standard feature of portable electronic devices such as smartphones, tablet PCs, and laptop computers. A typical digital camera is equipped with a mechanical iris to change an amount of incident light reaching an image sensor depending on a photography environment. However, since a camera module used in a small product like a portable electronic device has structural features and spatial limitations, it is difficult for the camera module to be equipped with a separate iris.

Since various components of an iris module needed to drive an iris cause a camera module to increase in weight, an autofocusing function of the camera module may be degraded. In addition, when the iris module includes a power connector itself, such as for a coil that drives the iris, the power connector may catch on something during vertical movement of a lens during autofocusing.

Furthermore, since an iris module having various apertures should be mounted in a narrow space, it is difficult to accurately fix a position of a driver setting the apertures. Accordingly, an accurate aperture cannot be realized.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing; a lens module including a yoke and disposed in the housing; an iris module including a plurality of blades and configured to form N apertures having different sizes using the plurality of blades; and an iris driver including a driving coil; and a magnet unit configured to be movable reciprocally in a linear direction and including a driving magnet opposing the driving coil and the yoke, wherein the yoke is configured to enable the magnet unit to be fixed at N positions along a movement path of the magnet unit.

The yoke may include N extensions opposing the driving magnet at the N positions of the magnet unit, and a width of each of the N extensions in an optical-axis direction may be greater than a width in the optical-axis direction of other portions of the yoke not opposing the driving magnet at the N positions of the magnet unit.

The yoke may include N yokes arranged at intervals along the movement path of the magnet unit.

The N yokes may be arranged parallel to a direction in which the magnet unit moves along the movement path of the magnet unit.

The yoke may include (N−2) extensions opposing the driving magnet at (N−2) positions of the N positions between opposite end positions of the N positions, a width of each of the (N−2) extensions in an optical-axis direction may be greater than a width in the optical-axis direction of other portions of the yoke not opposing the driving magnet at the (N−2) positions, and the iris module may further include two holding yokes respectively disposed at opposite ends of the movement path of the magnet unit to face a side surface or a bottom surface of the driving magnet at the opposite end positions of the N positions.

The iris module may further include a base; and a movement guide unit protruding from the base in the optical axis direction, wherein the magnet unit may be movably mounted on the movement guide unit, and the holding units may be respectively disposed at opposite ends of the movement guide unit.

The iris module may be further configured to form three apertures having different sizes using the plurality of blades, and the sizes of the apertures may change in an order of a medium aperture, a largest aperture, and a smallest aperture as the magnet unit moves in one direction along the movement path of the magnet unit.

The yoke may have a structure enabling the magnet unit to be fixed at the N positions along a movement path of the magnet unit by an attractive force between the yoke and the driving magnet.

In another general aspect, an iris module includes a base; a plurality of blades disposed above the base and overlapping one another, the plurality of blades being configured to form N apertures having different sizes; a magnet unit disposed on the base and configured to be movable in a direction perpendicular to an optical axis direction, the magnet unit including a driving magnet; and a yoke configured to provide N positions at which the magnet unit is fixed along a movement path of the magnet unit by an attractive force between the yoke and the driving magnet.

The yoke may include N yokes arranged at intervals along the movement path of the magnet unit.

The yoke may include (N−2) extensions opposing the driving magnet at (N−2) positions of the N positions between opposite end positions of the N positions, a width of each of the (N−2) extensions in an optical-axis direction may be greater than a width in an optical-axis direction of other portions of the yoke not opposing the driving magnet at the (N−2) positions, and the yoke may further include two first holding units respectively protruding from opposite ends of the yoke to respectively face side surfaces of the driving magnet at the opposite end positions of the N positions.

The yoke may include (N−2) extensions opposing the driving magnet at (N−2) positions of the N positions between two end positions of the N positions, a width of each of the (N−2) extensions in an optical-axis direction may be greater than a width in an optical-axis direction of other portions of the yoke not opposing the driving magnet at the (N−2) positions, and the yoke may further include two second holding units respectively protruding from opposite ends of the yoke in an optical axis direction to oppose the driving magnet at the opposite end positions of the N positions.

The yoke may further include two third holding units respectively extending from ends of the two second holding units to face a bottom surface of the driving magnet at the opposite end positions of the N positions.

In another general aspect, a camera module includes a lens module; and an iris module fixed to an upper portion of the lens module, the iris module including a base; a plurality of blades each having N holes having different sizes connected to each other; and a driving magnet disposed on the base and configured to be movable in a direction perpendicular to an optical axis direction, wherein the plurality of blades are configured to move rotationally in response to a linear motion of the driving magnet to form N apertures having different sizes.

The plurality of blades may be two blades.

The camera module may further include a position sensor configured to sense a position of the driving magnet.

The camera module may further include a yoke opposing the driving magnet, wherein the yoke may have a structure enabling the driving magnet to be fixed at N positions along a movement path of the driving magnet by an attractive force between the yoke and the driving magnet.

The camera module may further include a gap spacer having a through-hole having a center aligned with a center of the N apertures formed by the plurality of blades, wherein the through-hole may have a size smaller than a size of a largest aperture formed by the plurality of blades and larger than a size of a next-largest aperture formed by the plurality of blades.

In another general aspect, an iris module includes a driving coil configured to generate a magnetic field; a magnet unit including a driving magnet and configured to be movable relative to the driving coil along a linear path by an interaction between a magnetic field of the driving magnet and the magnetic field generated by the driving coil; a yoke configured to hold the magnet unit at N positions along the linear path; and a plurality of blades configured to rotate to form N apertures having different sizes in response to movement of the magnet unit along the linear path, each of the N apertures being formed at a different one of the N positions.

The iris module may further include a base, wherein the magnet unit may be mounted on the base so that the magnet unit is movable relative to the base along the linear path, the plurality of blades may be mounted on the base so that the plurality of blades are rotatable relative to the base, the base may be configured to be coupled to a lens module mounted in a housing of a camera module so that the base is movable together with the lens module relative to the housing, the driving coil may be configured to be mounted on the housing, and the yoke may be configured to be mounted on the lens module.

The iris module may further include a base, wherein the magnet unit may be mounted on the base so that the magnet unit is movable relative to the base along the linear path, the plurality of blades may be mounted on the base so that the plurality of blades are rotatable relative to the base, the yoke may be mounted on the base, the base may configured to be mounted in a housing of a camera module so that the base is movable relative to the housing, and the driving coil may be configured to be mounted on the housing.

The base may be further configured to be coupled to a lens module of the camera module so that the base is movable together with the lens module relative to the housing.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
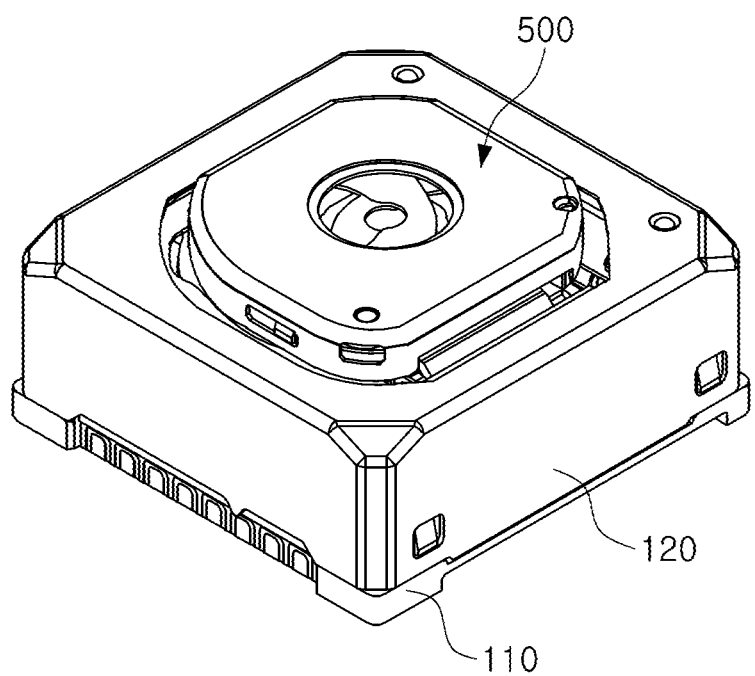
FIG. 1 is a perspective view of an example of a camera module.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Examples of a camera module described herein may be mounted in portable electronic devices such as such as mobile communications terminals, smartphones, and tablet PCs.

Figure 2:
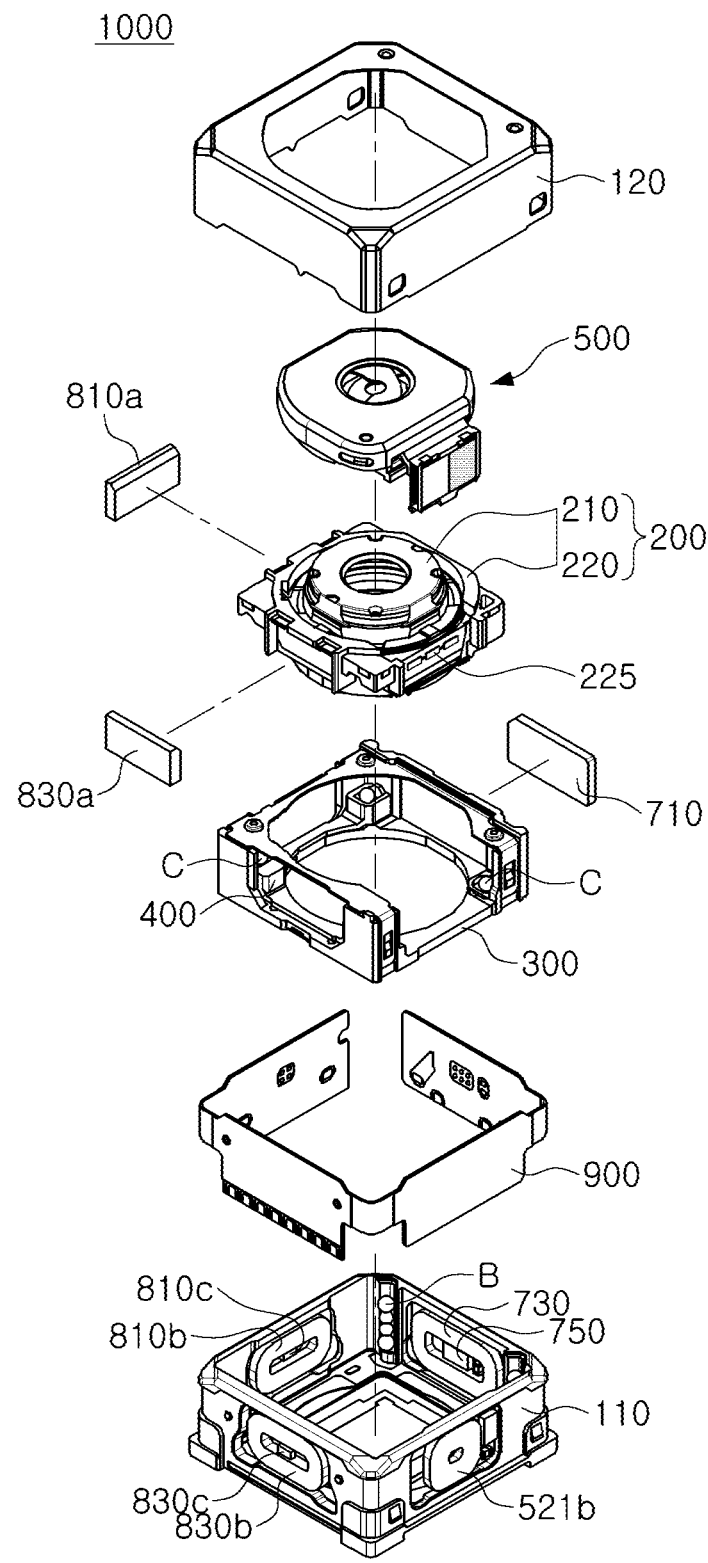
FIG. 2 is an exploded perspective view of the camera module of FIG. 1.

FIG. 1 is a perspective view of an example of a camera module. FIG. 2 is an exploded perspective view of the camera module of FIG. 1, and FIG. 3 is a partial perspective view of the camera module of FIG. 1.

Figure 3:
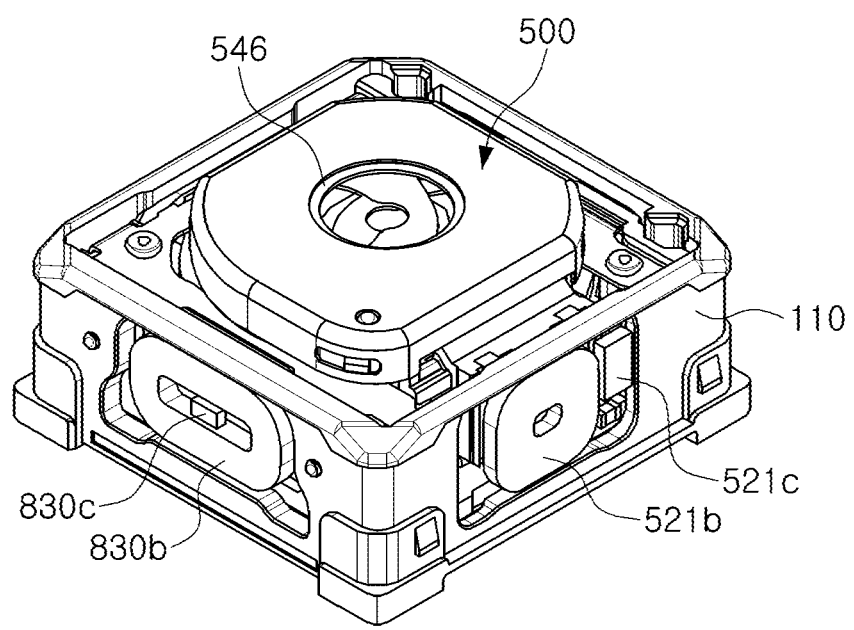
FIG. 3 is a partial perspective view of the camera module of FIG. 1.

Referring to FIGS. 1 to 3, a camera module 1000 includes a lens module 200, a carrier 300, a guide unit 400, an iris module 500, a housing 110, and a case 120.

The lens module 200 includes a lens barrel 210 including a plurality of lenses configured to capture an image of a subject and a holder 220 configured to hold the lens barrel 210. The plurality of lenses are disposed inside the lens barrel 210. The lens module 200 is accommodated in the carrier 300.

The lens module 200 is configured to be movable in an optical axis direction to perform autofocusing. In the example illustrated in FIG. 2, the lens module 200 is moved with the carrier 300 in the optical axis direction by an autofocusing unit.

The autofocusing unit includes a magnet 710 configured to generate a driving force in the optical axis direction and a coil (AF driving coil) 730. The autofocusing unit further includes a position sensor 750, for example, an aperture sensor, to sense an optical axis direction position of the lens module 200 by sensing an optical axis direction position of the carrier 300 accommodating the lens module 200.

The magnet 710 is mounted on the carrier 300. In the example illustrated in FIG. 2, the magnet 710 is mounted on one surface of the carrier 300.

The coil 730 and the position sensor 750 are mounted in the housing 110. In the example illustrated in FIG. 2, the coil 730 and the position sensor 750 are fixed to the housing 110 to face the magnet 710. The coil 730 and the position sensor 750 are mounted on a board 900, and the board 900 is mounted on the housing 110.

The magnet 710 is a movable member mounted on the carrier 300 to move with the carrier 300 in the optical axis direction, and the coil 730 and the position sensor 750 are fixed members fixed to the housing 110.

When power is applied to the coil 730, the coil 730 generates a magnetic field, and the carrier 300 is moved in the optical axis direction by an interaction between a magnetic field of the magnet 710 and the magnetic field generated by the coil 730, and the position sensor 750 senses an optical axis direction position of the carrier 300.

Since the lens module 200 is accommodated in the carrier 300, the lens module 200 is moved with the carrier 300 in the optical axis direction by the movement of the carrier 300.

When the carrier 300 is moved, rolling members B disposed between the carrier 300 and the housing 110 reduce a friction force between the carrier 300 and the housing 110. In the example illustrated in FIG. 2, the rolling members B are in the form of a ball.

The rolling members B are disposed on both sides of the magnet 710 and the coil 730.

Although not illustrated in FIG. 2, a yoke may be mounted on the board 900. For example, the yoke may be mounted on the board 900 to face the magnet 710 with the coil 730 interposed therebetween.

An attractive force acts between the yoke and the magnet 710 in a direction perpendicular to the optical axis direction.

Accordingly, the rolling members B may be maintained in a state of contact with the carrier 300 and the housing 110 by the attractive force between the yoke and the magnet 710.

The yoke serves to focus a magnetic force of the magnet 710. Thus, generation of a leakage flux is prevented.

The yoke and the magnet 710 form a magnetic circuit.

The lens module 200 is moved in a first direction, perpendicular to an optical axis, and a second direction, perpendicular to the optical axis and the first direction, to correct image blurring caused by hand-shake caused by a user's hand shaking when capturing an image.

A shake correction unit compensates for shaking caused by hand-shake when an image is captured by applying relative displacement corresponding to the shaking to the lens module 200.

The guide unit 400 is accommodated in the carrier 300 to be disposed in a location in the optical axis direction. The holder 220 is placed on the guide unit 400. Ball members C are provided to serve as rolling bearings between the carrier 300 and the guide unit 400 in the optical axis direction, and between the guide unit 400 and the holder 220 in the optical axis direction.

When the lens module 200 is moved in the first direction and the second direction, perpendicular to the optical axis, the guide unit 400 guides the lens module 200.

In the example illustrated in FIG. 2, the lens module 200 is configured to move relative to the guide unit 400 in the first direction, and the guide unit 400 and the lens module 200 are configured to move together in the second direction within the carrier 300.

The shake correction unit includes a plurality of magnets 810a and 830a configured to generate a driving force for shake correction and a plurality of coils 810b and 830b that are optical image stabilization (OIS) driving coils. The shake correction unit further include a plurality of position sensors 810C and 830C, for example, aperture sensors, to sense positions in the first and second directions of the lens module 200.

Among the plurality of magnets 810a and 830a and the plurality of coils 810b and 830b, one magnet 810a and one coil 810b are disposed to face each other in the first direction to generate a driving force in the first direction, and the other magnet 830a and the other coil 830b are disposed to face each other in the second direction to generate a driving force in the second direction.

The plurality of magnets 810a and 830a are mounted on the lens module 200, and the plurality of coils 810b and 830b and the plurality of position sensors 810c and 830c disposed to face the plurality of magnets 810a and 830a are fixed to the housing 110. The plurality of coils 810b and 830b and the plurality of position sensors 810c and 830c are mounted on the board 900, and the board 900 is mounted on the housing 110.

The plurality of magnets 810a and 830a are movable members moving with the lens module 200 in the first and second directions, and the plurality of coils 810b and 830b and the plurality of position sensors 810c and 830c are fixed members fixed to the housing 110.

The ball members C are provided to support the guide unit 400 and the lens module 200. The ball members C guide the guide unit 400 and the lens module 200 during shake correction.

The ball members C are provided between the carrier 300 and the guide unit 400, between the carrier 300 and the lens module 200, and between the guide unit 400 and the lens module 200.

When a driving force is generated in the first direction, the ball members C disposed between the lens module 200 and the guide unit 400 roll in the first direction. Accordingly, the ball members C guide movement of the lens module 200 in the first direction.

When a driving force is generated in the second direction, the ball members C disposed between the guide unit 400 and the carrier 300 roll in the second direction. Accordingly, the ball members C guide movement of the lens module 200 and the guide unit 400 together in the second direction.

The lens module 200 and the carrier 300 are accommodated in the housing 110. In the example illustrated in FIG. 2, the housing has an open top and an open bottom, and the lens module 200 and the carrier 300 are accommodated in an internal space of the housing 110.

Although not illustrated in FIG. 2, a printed circuit board (PCB) with an image sensor mounted thereon is disposed below the housing 100.

The case 120 is coupled to the housing 110 to cover an external surface of the housing 110 and protect internal components of the camera module 1000. The case 120 also shields electromagnetic waves.

As an example, the case 120 shields electromagnetic waves generated in the camera module 1000 to prevent the electromagnetic waves from affecting other electronic components inside a portable electronic device in which the camera module 1000 is mounted.

Since not only the camera module but also other various electronic components are mounted in the portable electronic device, the case 120 also shields electromagnetic waves generated in the electronic components to prevent the electromagnetic waves from affecting the camera module 1000.

The case 120 is made of a metal and is grounded to a ground pad provided on the PCB to enable the case 120 to shield the electromagnetic waves.

The iris module 500 is a device configured to selectively change the amount of incident light passing through the lens module 200 and reaching the image sensor.

As an example, the iris module 500 is provided with a plurality of apertures having different sizes. Light is incident through one of the plurality of apertures depending on a photography environment.

Figure 4:
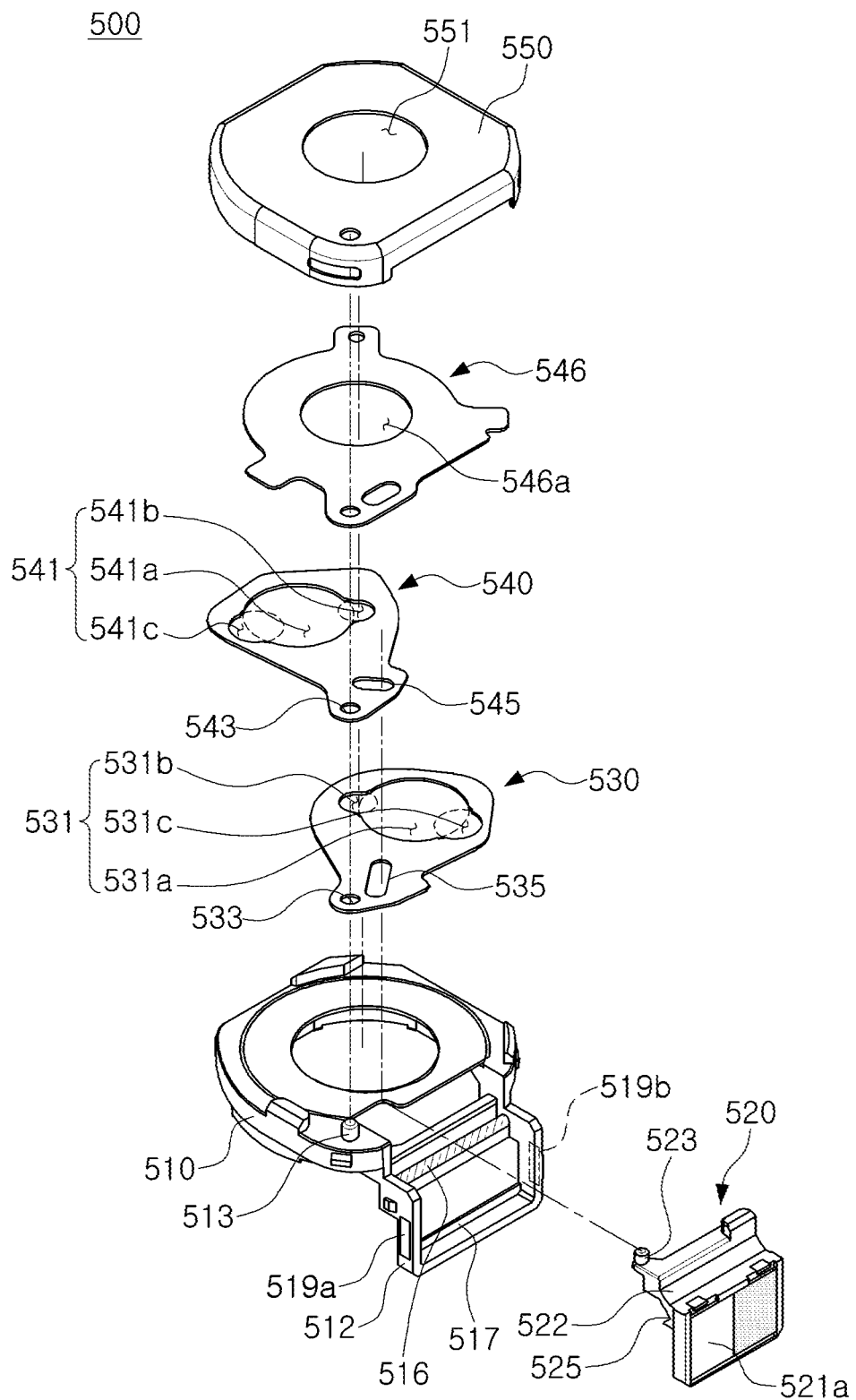
FIG. 4 is an exploded perspective view of an example of an iris module.
Figure 5A:
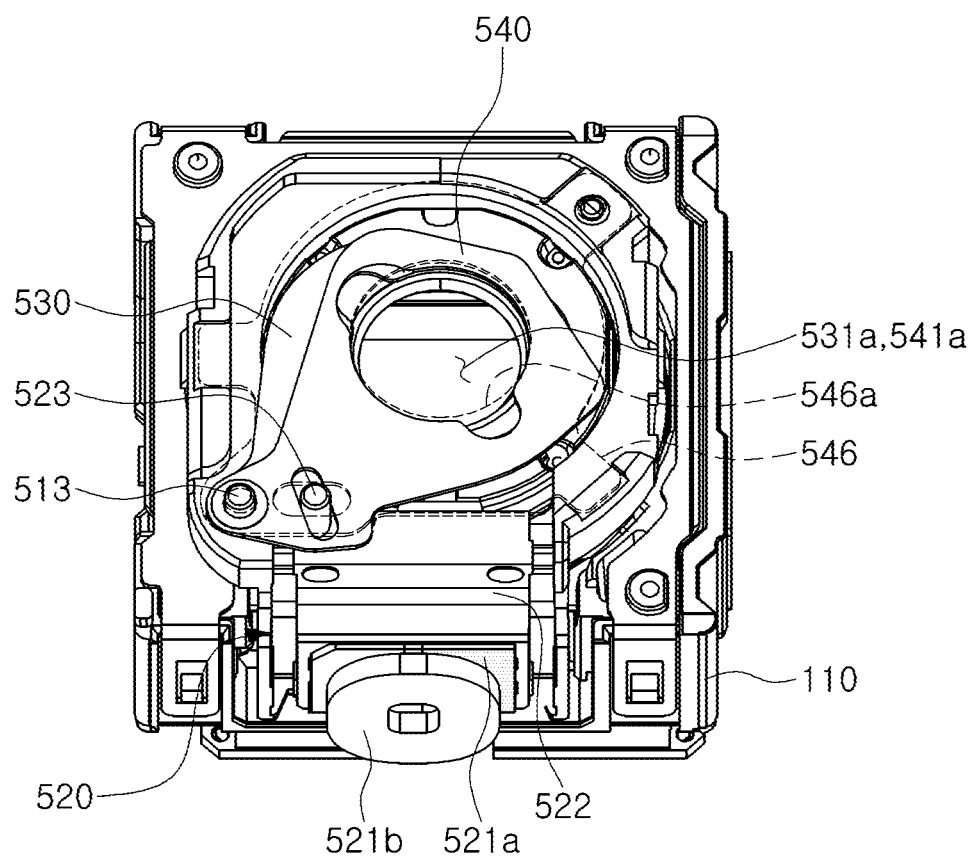
FIGS. 5A to 5C are plan views illustrating an example of how the iris module of FIG. 4 is driven to change a diameter of an aperture.
Figure 5B:
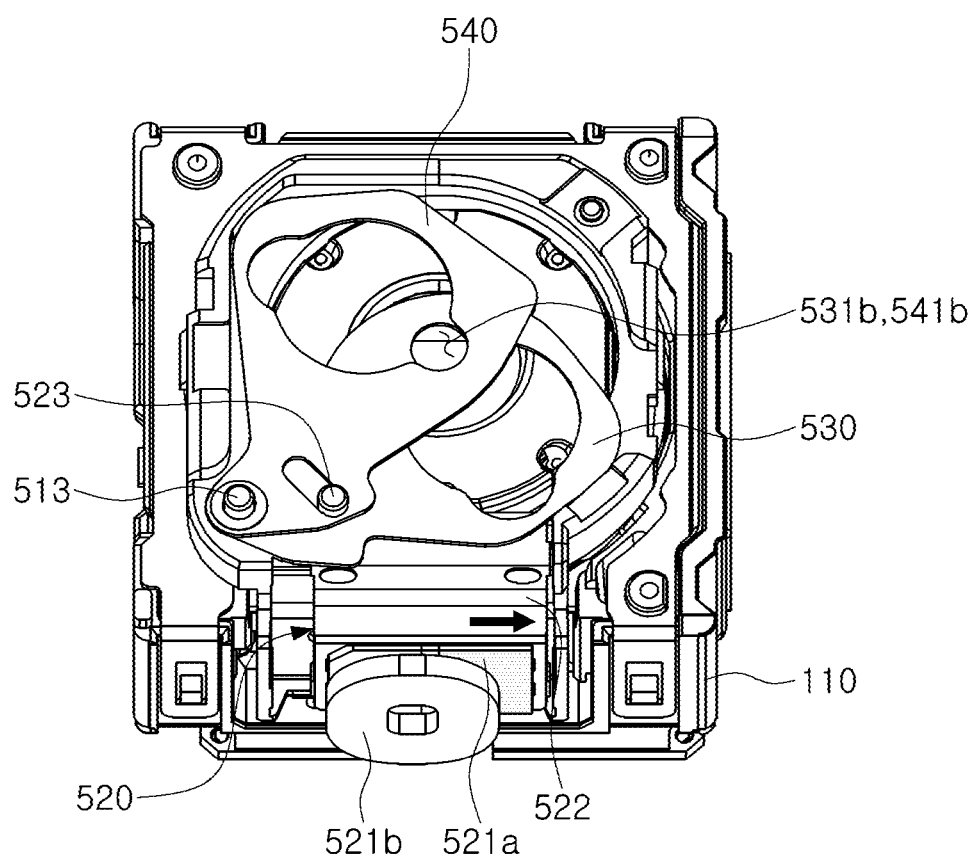
Figure 5C:
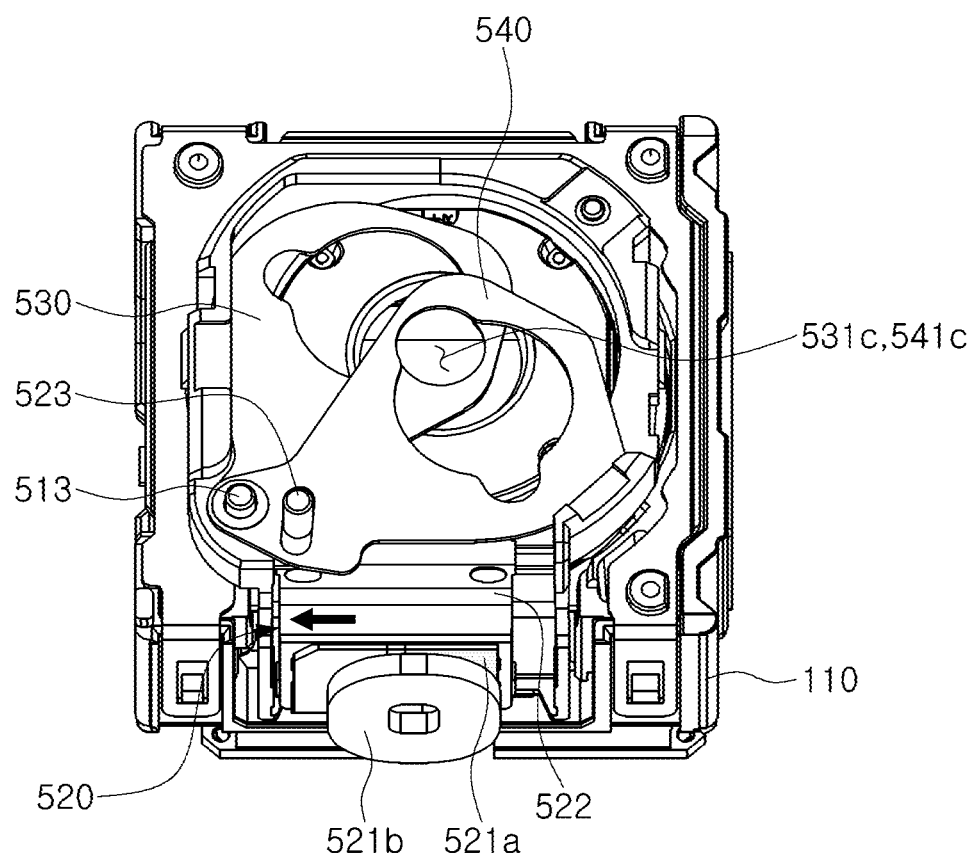

FIG. 4 is an exploded perspective view of an example of an iris module, and FIGS. 5A to 5C are plan views illustrating an example of how the iris module of FIG. 4 is driven to change a diameter of an aperture.

An iris module 500 illustrated in FIG. 4 includes at least two blades disposed to overlap each other so that at least two apertures having different sizes may be formed by a combination of through-holes formed in the blades. The iris module 500 will be described with reference to a structure in which three apertures are formed using two blades. However, the iris module 500 is not limited thereto, but may be, for example, an iris module in which apertures having different sizes are formed using three or more blades, such as an iris module disclosed in Korean Patent Application No. 10-2018-0053688 filed on May 10, 2018, the entire disclosure of which is incorporated herein by reference for all purposes.

The iris module 500 is coupled to the lens module 200 and is configured to selectively change the amount of incident light passing through the lens module 200.

The iris module 500 makes it possible to reduce an amount of light that is incident on the lens module 200 in a high-illuminance environment and increase an amount of light that is incident on the lens module in a low-illuminance environment to maintain a constant image quality in various illuminance environments.

The iris module 500 is coupled to the lens module 200 to be movable with the lens module 200 in an optical axis direction, a first direction, and a second direction. For example, the lens module 200 and the iris module 500 are configured to be movable together during autofocusing and shake correction. Thus, a distance between the lens module 200 and the iris module 500 does not change.

Referring to FIG. 4, the iris module 500 includes a base 510, a first blade 530, a second blade 540, and an iris driver including a magnet unit 520 and a coil 521b. The coil 521b is not shown in FIG. 4, but is shown in FIGS. 2, 3, and 5A to 5C. The iris module 500 further includes a cover 550 configured to cover the first blade 530 and the second blade 540 and having a through-hole 551 through which light is incident.

The first blade 530 is provided with a first through-hole 531, and the second blade 540 is provided with a second through-hole 541. The first blade 530 and the second blade 540 are slidably movable in contact with each other, so they may be antistatically treated to prevent generation of frictional electricity.

The first blade 530 is provided with a first guide hole 533 and a third guide hole 535, and the second blade 540 is provided with a second guide hole 543 and a fourth guide hole 545.

The first guide hole 533 and the second guide hole 543 have a circular shape, and the third guide hole 535 and the fourth guide hole 545 have an elongated shape in one direction and are inclined in one direction. Directions of inclination of the third guide hole 535 and the fourth guide hole 545 oppose each other with respect to a direction in which the magnet unit 520 moves.

A linear motion of the magnet unit 520 is converted into a rotational motion, which causes the first blade 530 and the second blade 540 to rotate about a first projection 513 that is their rotational axis.

The first through-hole 531 and the second through-hole 541 have a shape in which N through-holes (531a, 531b, and 531c) and (541a, 541b, and 541c) having different diameters are connected to each other (N being an integer greater than or equal to two). In the example illustrated in FIG. 4, three apertures are formed. The first through-hole 531 and the second through-hole 541 have a shape in which the through-holes (531a and 541a) having a relatively large diameter, the through-holes (531b and 541b) having a relatively small diameter, and the through-holes (531c and 541c) having a medium diameter are connected to each other. As an example, the first through-hole 531 and the second through-hole have an overall shape in which three holes are connected to each other and the through-holes 531a, 531b, 531c, 541a, 541b, and 541c have a circular shape or a polygonal shape.

The first through-hole 531 and the second through-hole 541 have shapes that are mirror images of each other. For example, the first blade 530 and the second blade 540 rotate about the first projection 513 as a rotational axis while the first projection 513 is inserted into both the first guide hole 533 and the second guide hole 543. In consideration thereof, the first through-hole 531 and the second through-hole 541 are substantially symmetrical in a circumferential direction.

The first blade 530 and the second blade 540 are coupled to the base 510 so that portions of the first and second blades 530 and 540 overlap each other in the optical axis direction and are configured to be movable by the iris driver. In the example illustrated in FIG. 4, the first blade 530 and the second blade 540 are configured to be rotatable in opposite directions.

In addition, the first and second through-holes 531 and 541 are configured so that their portions overlap each other in the optical axis direction. The portions of the first and second through-holes 531 and 541 overlap each other in the optical axis direction to form an aperture through which light passes.

Portions of the first and second through-holes 531 and 541 overlap each other to form a plurality of apertures having different diameters. As an example, portions of the first and second through-holes 531 and 541 overlap each other to form apertures (531a and 531b) having a relatively large diameter, apertures (531b and 541b) having a relatively small diameter, and apertures (531c and 541c) having a medium diameter (an aperture may have a circular shape or a polygonal shape depending on the shape of the first and second through-holes 531 and 541).

Accordingly, light is incident through one of the plurality of apertures according to a photography environment.

In the example illustrated in FIG. 4, a largest-sized aperture formed by the first and second blades 530 and 540 is adjusted by a gap spacer 546. The gap spacer 546 is disposed adjacent to the first and second blades 530 and 540 of the iris module 500. The gap spacer 546 has a through-hole 546a smaller than the largest-sized aperture formed by the first and second blades 530 and 540 and larger than a medium-sized aperture formed by the first and second blades 530 and 540. A center of the through-hole 546a is aligned with a center of the aperture formed by the first and second blades 530 and 540 in the optical axis direction.

For ease of description, the gap spacer 546 will be described as being disposed adjacent to a top surface of the second blade 540 nearest to the object. However, the position of the gap spacer 546 is not limited thereto. For example, the gap spacer 546 may instead be disposed adjacent to a bottom surface of the first blade 530 nearest to the image sensor, or between the first and second blades 530 and 540.

Accordingly, the largest-sized aperture realized by the iris module 500 has the same size as the through-hole 546a of the gap spacer 546. The realization of the largest-sized aperture using the gap spacer 546 is intended to deal with the case in which the largest-sized aperture formed by overlapping of the first and second blades 530 and 540 does not have a desired shape due to slight variations in manufacturing and assembling the iris module 500.

Referring to FIG. 5A, when the magnet unit 520 is disposed in the middle of a movement guide unit 512, the first blade 530 and the second blade 540 are moved rotationally about the first projection 513 as an axis and portions of the first through-hole 531 and the second through-hole 541 overlap each other to form the apertures 531a and 541a having a relatively large diameter. In the example illustrated in FIGS. 4 and 5A through 5C, the through-hole 546a smaller than the largest-sized apertures 531a and 541a formed by the first blade 530 and the second blade 540 is formed in the gap spacer 546. In this case, the largest-sized aperture is realized by the through-hole 546a of the gap spacer 546.

Referring to FIG. 5B, when the magnet unit 520 is disposed at one side of the movement guide unit 512, the first blade 530 and the second blade 540 are moved rotationally about the first projection 513 as an axis and portions of the first through-hole 531 and the second through-hole 541 overlap each other to form the apertures 531b and 541b having relatively smallest diameters.

Referring to FIG. 5C, when the magnet unit 520 is disposed at the other side of the movement guide unit 512, the first blade 530 and the second blade 540 are moved rotationally about the projection 513 as an axis and portions of the first through-hole 531 and the second through-hole 541 overlap each other to form the apertures 531c and 541c having a relatively medium diameter.

The iris driver includes the magnet unit 520 disposed on the base 510 to be movable in a direction perpendicular to an optical axis direction and the coil 521b (an iris driving coil) fixed to the housing 110 to oppose the magnet unit 520. The coil 521b is mounted on the board 900, and the board 900 is mounted on the housing 110. The board 900 is electrically connected to the printed circuit board (PCB) attached to a bottom of the camera module 1000.

The example illustrated in FIGS. 4 and 5A through 5C uses a closed-loop control scheme to sense and feed back a position of the magnet unit 520 when the magnet unit 520 moves linearly. Hence, a position sensor 521c is provided for the closed loop control scheme. The position sensor 521c is mounted adjacent to the center or a side surface of the coil 521b to oppose a magnet 521a of the magnet unit 520. The position sensor 521c is mounted on the board 900.

The magnet unit 520 is a movable member that moves with the base 510 in the optical axis direction, a first direction, and a second direction, and the coil 521b is a fixed member fixed to the housing 110.

Since the coil 521b configured to provide a driving force to the iris module 500 is disposed outside of the iris module 500, for example, in the housing 110 of the camera module 1000, the iris module 500 is decreased in weight.

For example, since the coil 521b configured to provide a driving force to the iris module 500 is provided as a fixed member, the coil 521b does not move during autofocusing or hand-shake correction. Thus, a weight increase of the lens module 200 resulting from adding the iris module 500 is significantly reduced.

In addition, since the coil 521b configured to provide a driving force to the iris module 500 is disposed on the housing 110, which is a fixed member, to be electrically connected to the PCB, there is no influence on the coil 521b of the iris driver during autofocusing and shake correction, even when the lens module 200 and the iris module 500 move.

As a result, an autofocusing function is prevented from being degraded.

The movement guide unit 512 with the magnet unit 520 disposed thereon is provided on the base 510. The movement guide unit 512 protrudes from the base 510 in the optical axis direction. The movement guide unit 512 is provided in the form of a square frame so that the magnet unit 520 is easily seated in the movement guide unit 512.

The magnet unit 520 includes the magnet 521a, which is disposed to face the coil 521b, and a magnet holder 522 on which the magnet 521a is mounted. The magnet 521a is opposes the coil 521b in a direction perpendicular to the optical axis direction.

The magnet unit 520 is disposed on the movement guide unit 512 of the base 510. A rod member 516 configured to support the magnet unit 520 is provided on the base 510 so that the magnet unit 520 can slide back and forth along the rod member 516. Additionally, an insertion groove 525 is formed in the magnet unit 520 to accommodate the rod member 516 in the insertion groove 525.

The rod member 516 has a circular shape or a plate shape to enable the magnet unit 520 to move slidably, and the insertion groove 525 has a shape of a portion of a circle having a smaller diameter than the rod member 516 so that the insertion groove 525 only contacts the rod member 516 along two lines to reduce a frictional force between the insertion groove 525 and the rod member 516. Alternatively, although not shown, the insertion groove 525 may have a shape of a portion of a polygon.

When only the rod member 516 is in contact with the magnet unit 520, the magnet unit 520 may be unstable and may tilt. To prevent this, a support spaced apart from the rod member 516 is provided. In the example illustrated in FIG. 4, a guide blade 517 is provided on an end of the movement guide unit 512 to be substantially parallel to the rod member 516.

The first projection 513 is provided on the base 510 to penetrate both the first guide hole 533 of the first blade 530 and the second guide hole 543 of the second blade 540. The first blade 530 and the second blade 540 rotate about the first projection 513 as an axis.

The magnet holder 522 is provided with a second projection 523 disposed to penetrate the first blade 530 and the second blade 540.

The first projection 523 is configured to penetrate the third guide hole 535 of the first blade 530 and the fourth guide hole 545 of the second blade 540.

The third guide hole 535 and the fourth guide hole 545 are formed to be inclined lengthwise in a direction in which the magnet unit 520 moves, and directions of inclination of the third guide hole 535 and the fourth guide hole 545 oppose each other with respect to the direction in which the magnet unit 520 moves.

Accordingly, the second projection 523 moves within the third guide hole 535 and the fourth guide hole 545 when the magnet unit 520 moves along one axis. As the second projection 523 moves, the first blade 530 and the second blade 540 move toward the magnet unit 520 or move away from the magnet unit 520 (see FIGS. 5A to 5C). The first blade 530 and the second blade 540 move in opposite directions relative to each other. Thus, as the first blade 530 moves toward the magnet unit 520, the second blade 540 moves away from the magnet unit 520. Also, as the first blade 530 moves away from the magnet unit 520, the second blade 540 moves toward the magnet unit 520.

In the example illustrated in FIG. 4, the movement guide unit 512 includes holding yokes 519a and 519b disposed to oppose both side surfaces of the magnet 521a.

The lens module 200 (more specifically, the holder 220) includes a yoke 225 (see FIG. 2) disposed to oppose the magnet 521a.

Due to an attractive force between the yoke 225 and the magnet 521a, the magnet unit 520 is maintained in close contact with the movement guide unit 512 while the magnet unit 520 moves slidably.

The magnet unit 520 moves in a direction perpendicular to the optical axis direction. As the magnet unit 520 moves, the first and second blades 530 and 540 rotate to change a size of an aperture among three sizes (large, medium, and small sizes). Accordingly, when the magnet unit 520 moves from one end of the movement guide unit 512 to the other end of the movement guide 512 in the direction perpendicular to the optical axis direction, the size of the aperture changes among three sizes (N sizes, N being a positive integer). In this case, the magnet unit 520 is maintained in a state of being fixed to three (N) positions such as both ends and a middle of the movement guide unit 512.

As described above, when the magnet unit 520 moves along the movement guide unit 512 in the direction perpendicular to the optical axis direction, the yoke 225 enables the magnet unit 520 to be maintained in a state of being fixed to the three (N) positions by an attractive force between the magnet 521a and the yoke 225. For example, even when the coil 521b is not supplied with power, the magnet unit 520 is maintained in a state of forming one of the large, medium, and small apertures while a position of the magnet unit 520 is fixed to one of the three (N) positions by the attractive force between the magnet 521a and the yoke 225 (or one of the holding yokes 519a and 519b).

Figure 6:
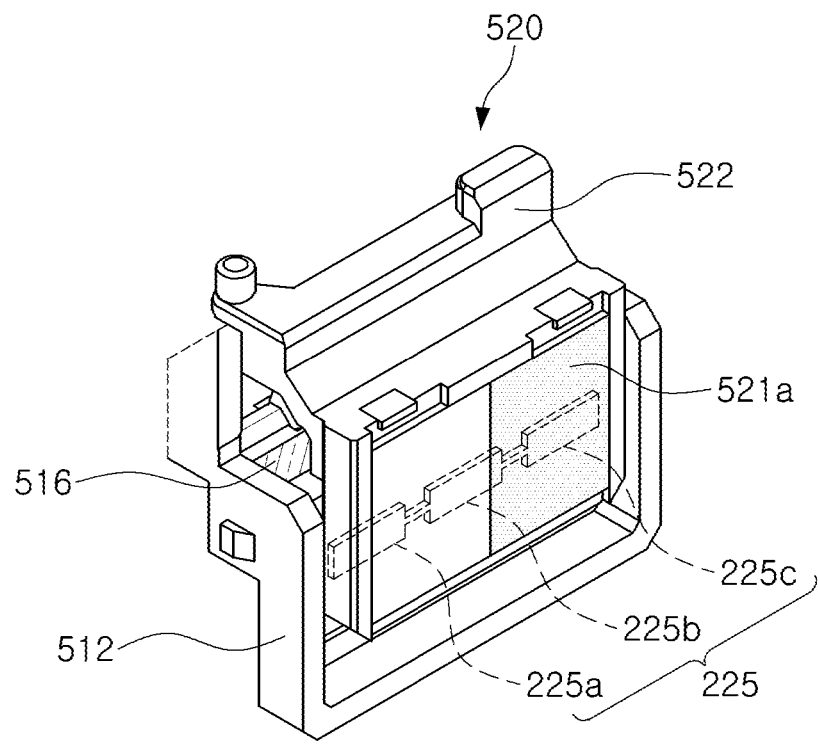
FIGS. 6 to 8 are views illustrating examples of a yoke of the iris module of FIG. 4.
Figure 7:
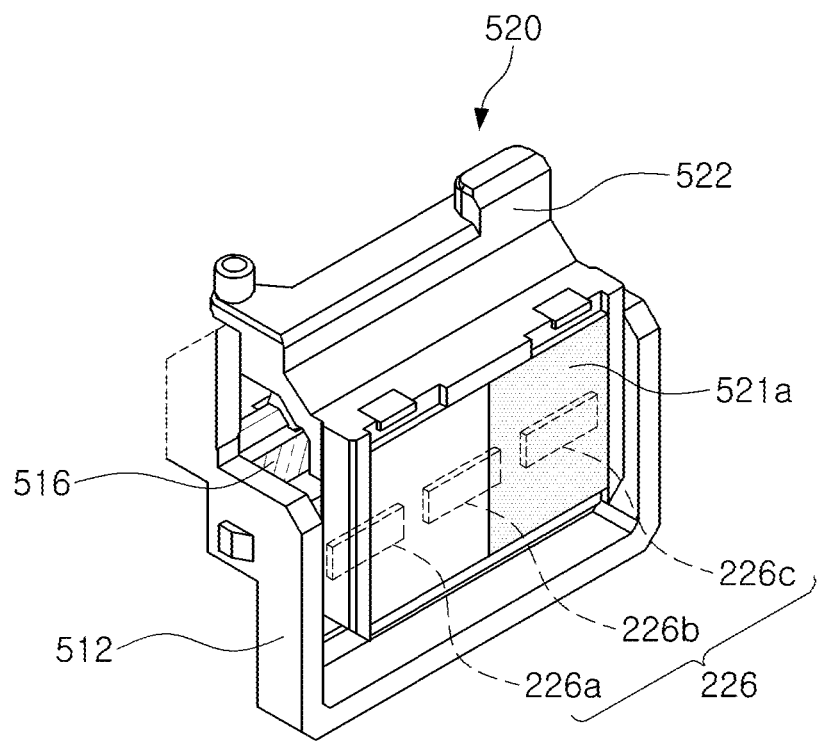
Figure 8:
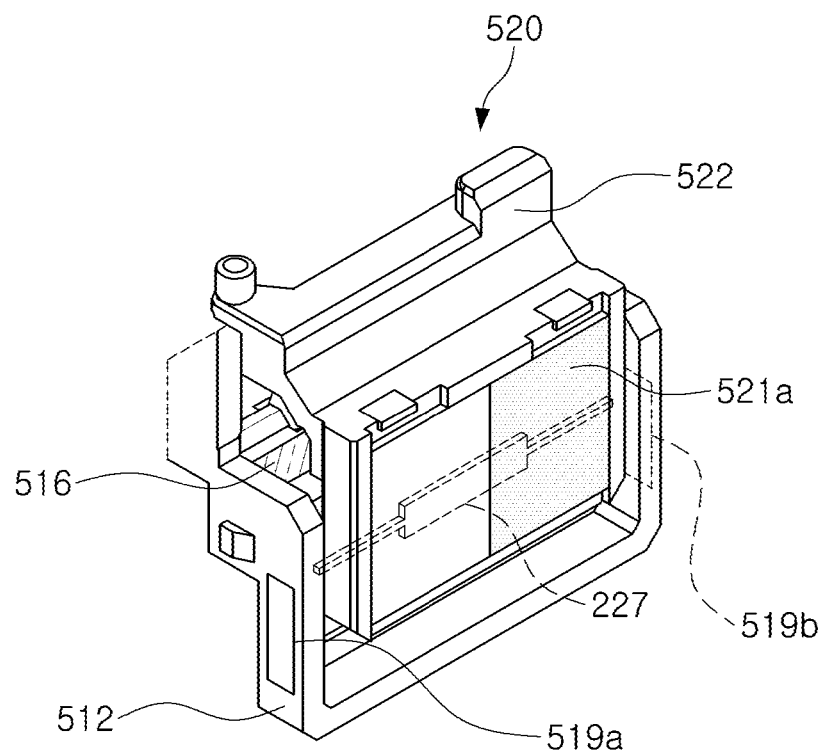

FIGS. 6 to 8 are views illustrating examples of a yoke of the iris module of FIG. 4.

For example, as shown in FIG. 6, the yoke 225 includes three (N) extensions 225a, 225b, and 225c having a greater width in the optical-axis direction than other portions of the yoke 225 so that the magnet unit 520 is fixed at the three (N) positions by the attractive force between magnet 521a and the three (N) extensions 225a, 225b, and 225c. The yoke 225 is fixed to one side surface of the lens module 200.

Alternatively, as shown in FIG. 7, a yoke 226 includes first to third yokes 226a, 226b, and 226c so that the magnet unit 520 is fixed to the three (N) positions by an attractive force between the magnet 521a and the first to third yokes 226a, 226b, and 226c. The first to third yokes 226a, 226b, and 226c are arranged at regular intervals along a movement path of a magnet unit 520. The yoke 226 is fixed to one side surface of the lens module 200.

Alternatively, one (N−2) yoke 227 and two holding yokes 519a and 519b are shown as shown in FIG. 8. The one yoke 227 is mounted on one side surface of the lens module 200 to fix the magnet unit 520 to one (N−2) position by an attractive force between the magnet 521a and the one yoke 227. The two holding yokes 519a and 519b are mounted on the movement guide unit 512 of the iris module 500 to respectively oppose both side surfaces of the magnet 521a.

Figure 9:
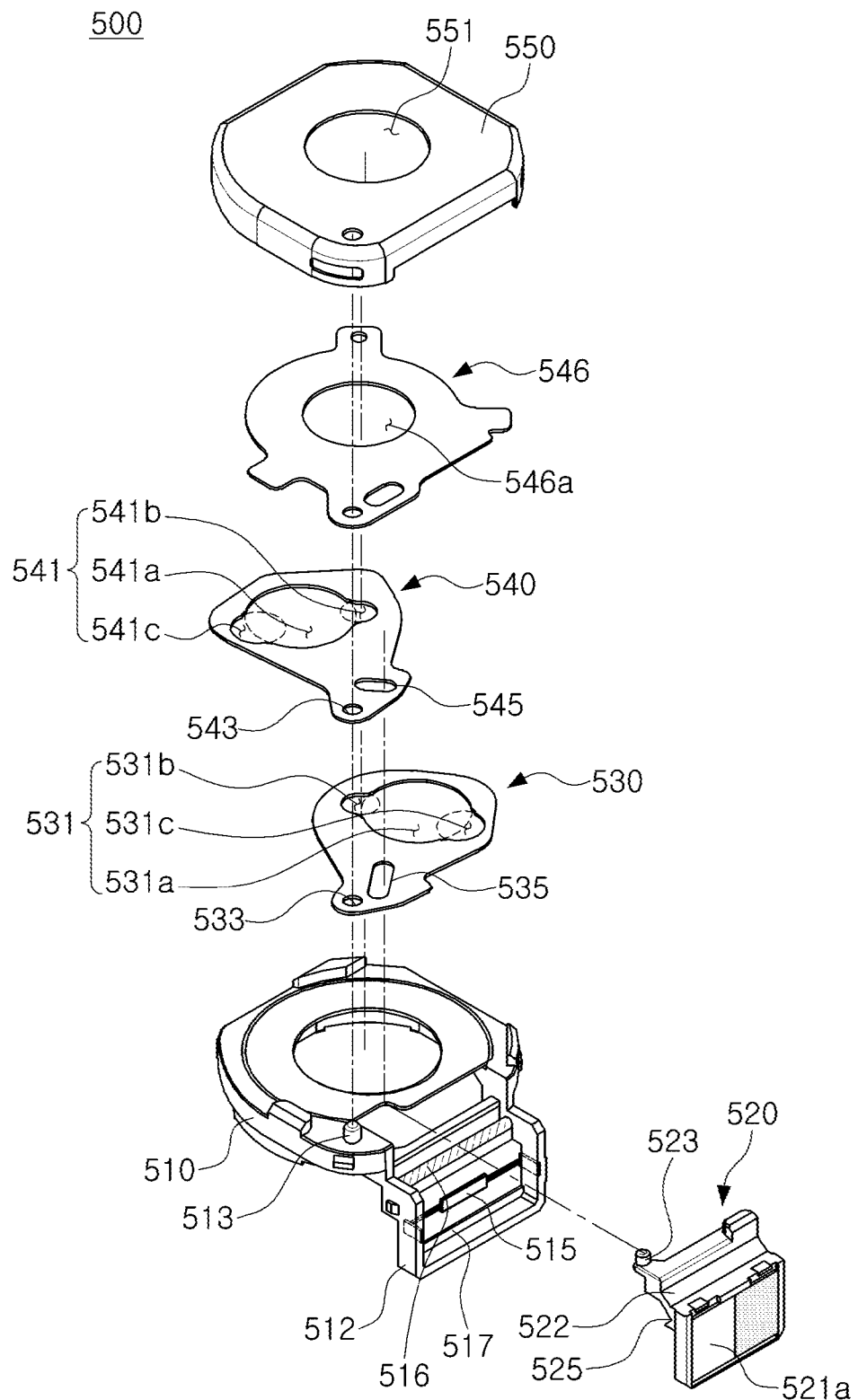
FIG. 9 is an exploded perspective view of another example of an iris module.

FIG. 9 is an exploded perspective view of another example of an iris module.

Referring to FIG. 9, an iris module 501 includes a yoke 515 provided on the base 510 rather than on the lens module 200. More specifically, the yoke 515 is provided on the movement guide unit 512 to oppose the magnet 521a.

When the magnet unit 520 moves along the movement guide unit 512 in a direction perpendicular to the optical axis direction, the yoke 515 enables the magnet unit 520 to be maintained in a state of being fixed at three (N) positions by an attractive force between the magnet 521a and the yoke 515. For example, even when the coil 521b is not supplied with power, the magnet unit 520 is maintained in a state of forming one of the large, medium, and small apertures while a position of the magnet unit 520 is fixed by the attractive force between the magnet 521a and the yoke 515 or a holding yoke to be described below.

Figure 10:
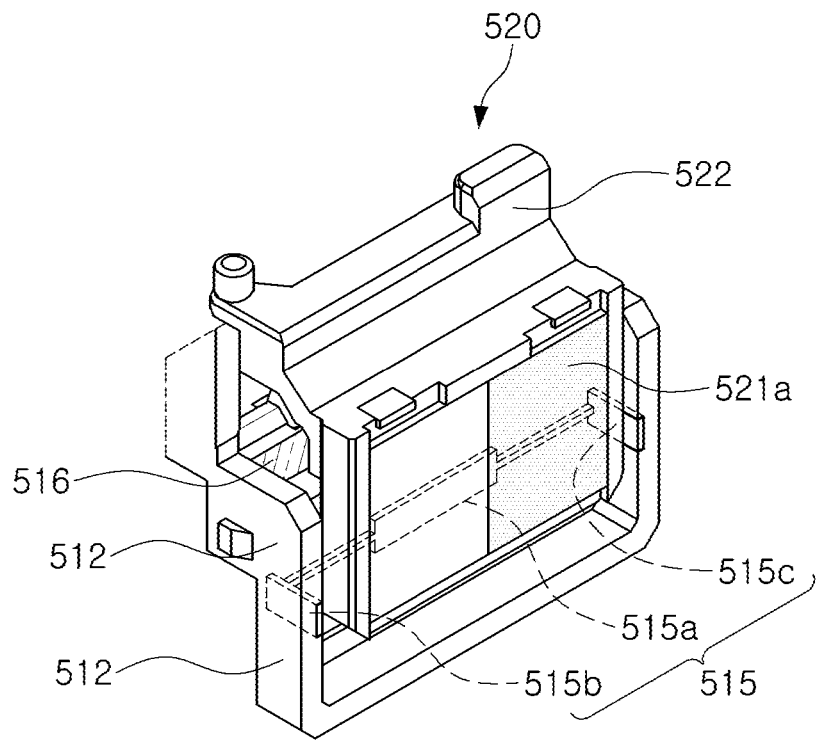
FIGS. 10 and 11 are views illustrating examples of a yoke of the iris module of FIG. 9.
Figure 11:
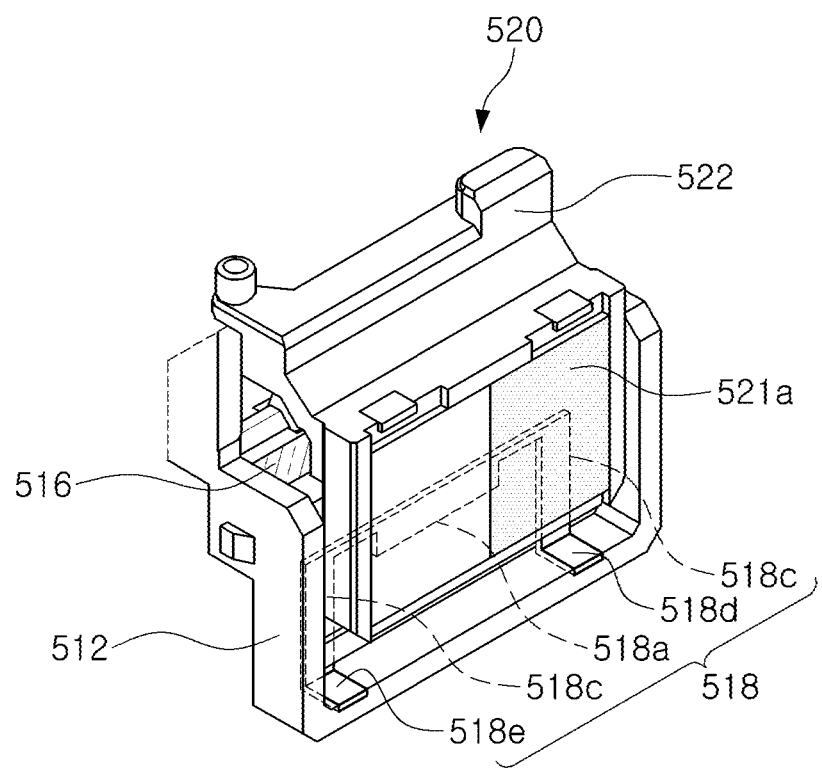

FIGS. 10 and 11 are views illustrating examples of a yoke of the iris module of FIG. 9.

As shown in FIG. 10, the yoke 515 includes one (N−2) extension 515a and two first holding units 515b and 515c that are provided so that the magnet unit 520 is fixed at three (N) positions by an attractive force between the magnet 521a and the extension 515a and the two first holding units 515b and 515c. The extension 515a has a width in the optical-axis direction that is greater than a width of other portions of the yoke 515 on both sides of the extension 515a, and faces a front surface of the magnet 521a. The two first holding units 515b and 515c extend from the other portions of the yoke 515 extending from both sides of the extension 515a to face both side surfaces of the magnet unit 520, and are mounted on the base 510 via the movement guide unit 512 of the iris module 501.

Alternatively, as shown in FIG. 11, a yoke 518 includes one (N−2) extension 518a and two second holding units 518b and 518c that are provided so that a the magnet unit 520 is fixed at three (N) positions by an attractive force between the magnet 521a and the extension 518a and the two second holding units 518b and 518c. The extension 518a has a width in the optical-axis direction that is greater than a width of other portions of the yoke 518 extending from both sides of the extension 518a, and faces a front surface of the magnet 521a. The two second holding units 518b and 518c extend in an optical axis direction from the other portions of the yoke 518 extending from both sides of the extension 518a, and face a front surface of the magnet 521a. The two second holding units 515b and 515c are mounted on the movement guide unit 512.

Further, two third holding units 518d and 518e are additionally provided. The two third holding units 518b and 518c extend from the two second holding units 518b and 518c to face a bottom surface of the magnet 521a. The two third holding units 518d and 518e are mounted on the movement guide unit 512.

The examples of an iris module described above enable a camera module to selectively change an amount of incident light passing through an iris module and prevent an autofocusing function from being degraded when the iris module is mounted in the camera module. Moreover, a weight increase caused by using the iris module may be significantly reduced.

In the examples of an iris module described above, even when an iris module is mounted in the camera module, a weight increase of a driver is significantly reduced to prevent autofocusing and hand-shake correction functions from being degraded.

Furthermore, the examples of an iris module described above accurately realize various apertures.

While this disclosure includes specific examples, it will be apparent to after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a housing;
   a lens module comprising a yoke and disposed in the housing;
   an iris module comprising a plurality of blades and configured to form N apertures having different sizes using the plurality of blades, where N is an integer greater than or equal to 2; and
   an iris driver comprising:
      a driving coil; and
      a magnet unit configured to be movable reciprocally in a linear direction and comprising a driving magnet opposing the driving coil and the yoke,
   wherein the yoke is configured to enable the magnet unit to be fixed at N positions along a movement path of the magnet unit.

2. The camera module of claim 1, wherein the yoke comprises N extensions opposing the driving magnet at the N positions of the magnet unit, and
   a width of each of the N extensions in an optical-axis direction is greater than a width in the optical-axis direction of other portions of the yoke not opposing the driving magnet at the N positions of the magnet unit.

3. The camera module of claim 1, wherein the yoke comprises N yokes arranged at intervals along the movement path of the magnet unit.

4. The camera module of claim 3, wherein the N yokes are arranged parallel to a direction in which the magnet unit moves along the movement path of the magnet unit.

5. The camera module of claim 1, wherein N is an integer greater than or equal to 3,
   the yoke comprises N−2 extensions opposing the driving magnet at N−2 positions of the N positions between opposite end positions of the N positions,
   a width of each of the N−2 extensions in an optical-axis direction is greater than a width in the optical-axis direction of other portions of the yoke not opposing the driving magnet at the N−2 positions, and the iris module further comprises two holding yokes respectively disposed at opposite ends of the movement path of the magnet unit to face a side surface or a bottom surface of the driving magnet at the opposite end positions of the N positions.

6. The camera module of claim 5, wherein the iris module further comprises:
a base; and
a movement guide unit protruding from the base in the optical axis direction,
wherein the magnet unit is movably mounted on the movement guide unit, and
the holding units are respectively disposed at opposite ends of the movement guide unit.

7. The camera module of claim 1, wherein the iris module is further configured to form three apertures having different sizes using the plurality of blades such that N is equal to 3, and
the sizes of the three apertures change in an order of a medium aperture, a largest aperture, and a smallest aperture as the magnet unit moves in one direction along the movement path of the magnet unit.

8. The camera module of claim 1, wherein the yoke has a structure enabling the magnet unit to be fixed at the N positions along a movement path of the magnet unit by an attractive force between the yoke and the driving magnet.

9. An iris module comprising:
a base;
a plurality of blades disposed above the base and overlapping one another, the plurality of blades being configured to form N apertures having different sizes, where N is an integer greater than or equal to 2;
a magnet unit disposed on the base and configured to be movable in a direction perpendicular to an optical axis direction, the magnet unit comprising a driving magnet; and
a yoke configured to provide N positions at which the magnet unit is fixed along a movement path of the magnet unit by an attractive force between the yoke and the driving magnet.

10. The iris module of claim 9, wherein the yoke comprises N yokes arranged at intervals along the movement path of the magnet unit.

11. The iris module of claim 9, wherein N is an integer greater than or equal to 3,
the yoke comprises N−2 extensions opposing the driving magnet at N−2 positions of the N positions between opposite end positions of the N positions,
a width of each of the N−2 extensions in an optical-axis direction is greater than a width in an optical-axis direction of other portions of the yoke not opposing the driving magnet at the N−2 positions, and
the yoke further comprises two first holding units respectively protruding from opposite ends of the yoke to respectively face side surfaces of the driving magnet at the opposite end positions of the N positions.

12. The iris module of claim 9, wherein N is an integer greater than or equal to 3,
the yoke comprises N−2 extensions opposing the driving magnet at N−2 positions of the N positions between two end positions of the N positions,
a width of each of the N−2 extensions in an optical-axis direction is greater than a width in an optical-axis direction of other portions of the yoke not opposing the driving magnet at the N−2 positions, and
the yoke further comprises two second holding units respectively protruding from opposite ends of the yoke in an optical axis direction to oppose the driving magnet at the opposite end positions of the N positions.

13. The iris module of claim 12, wherein the yoke further comprises two third holding units respectively extending from ends of the two second holding units to face a bottom surface of the driving magnet at the opposite end positions of the N positions.

14. A camera module comprising:
a lens module; and
an iris module fixed to an upper portion of the lens module, the iris module comprising:
a base;
a plurality of blades each having N holes having different sizes connected to each other, where N is an integer greater than or equal to 2; and
a driving magnet disposed on the base and configured to be movable in a direction perpendicular to an optical axis direction,
wherein the plurality of blades are configured to move rotationally in response to a linear motion of the driving magnet to form N apertures having different sizes.

15. The camera module of claim 14, wherein the plurality of blades is two blades.

16. The camera module of claim 14, further comprising a position sensor configured to sense a position of the driving magnet.

17. The camera module of claim 14, further comprising a yoke opposing the driving magnet,
wherein the yoke has a structure enabling the driving magnet to be fixed at N positions along a movement path of the driving magnet by an attractive force between the yoke and the driving magnet.

18. The camera module of claim 14, further comprising a gap spacer having a through-hole having a center aligned with a center of the N apertures formed by the plurality of blades,
wherein the through-hole has a size smaller than a size of a largest aperture formed by the plurality of blades and larger than a size of a next-largest aperture formed by the plurality of blades.

19. An iris module comprising:
a driving coil configured to generate a magnetic field;
a magnet unit comprising a driving magnet and configured to be movable relative to the driving coil along a linear path by an interaction between a magnetic field of the driving magnet and the magnetic field generated by the driving coil;
a yoke configured to hold the magnet unit at N positions along the linear path, where N is an integer greater than or equal to 2; and
a plurality of blades configured to rotate to form N apertures having different sizes in response to movement of the magnet unit along the linear path, each of the N apertures being formed at a different one of the N positions.

20. The iris module of claim 19, further comprising a base,
wherein the magnet unit is mounted on the base so that the magnet unit is movable relative to the base along the linear path,
the plurality of blades are mounted on the base so that the plurality of blades are rotatable relative to the base, the base is configured to be coupled to a lens module mounted in a housing of a camera module so that the base is movable together with the lens module relative to the housing, the driving coil is configured to be mounted on the housing, and the yoke is configured to be mounted on the lens module.

21. The iris module of claim 19, further comprising a base, wherein the magnet unit is mounted on the base so that the magnet unit is movable relative to the base along the linear path, the plurality of blades are mounted on the base so that the plurality of blades are rotatable relative to the base, the yoke is mounted on the base, the base is configured to be mounted in a housing of a camera module so that the base is movable relative to the housing, and the driving coil is configured to be mounted on the housing.

22. The iris module of claim 21, wherein the base is further configured to be coupled to a lens module of the camera module so that the base is movable together with the lens module relative to the housing.

* * * * *